United States Patent [19]

Chonan et al.

[11] Patent Number: 4,892,372
[45] Date of Patent: Jan. 9, 1990

[54] ROTATING POLYGON MIRROR

[75] Inventors: Hideo Chonan, Toride; Michio Motohashi, Tokyo; Hirotaka Noguchi, Yawahara; Kazuo Ogawa, Ibaraki; Kimio Takahashi, Machida, all of Japan

[73] Assignee: Canon Kabushiki Kaisha, Tokyo, Japan

[21] Appl. No.: 767,734

[22] Filed: Aug. 20, 1985

[30] Foreign Application Priority Data

Aug. 31, 1984 [JP] Japan ................................ 59-180497

[51] Int. Cl.$^4$ .............................................. G02B 26/10
[52] U.S. Cl. ...................................... 350/6.8; 350/616
[58] Field of Search .................... 350/6.1, 6.5, 6.7, 6.8, 350/612, 616, 634, 6.6, 609

[56] References Cited

U.S. PATENT DOCUMENTS

| 2,988,456 | 6/1961 | Fairbanks et al. | 350/609 |
| 3,622,221 | 11/1971 | Kossyk et al. | 350/6.8 |
| 4,277,141 | 7/1981 | Kleiber | 350/616 |
| 4,662,709 | 5/1987 | Brueggemann | 350/6.7 |

FOREIGN PATENT DOCUMENTS

| 57-29004 | 2/1982 | Japan | 350/6.7 |
| 59-30512 | 2/1984 | Japan | 350/6.8 |
| 62-9313 | 1/1987 | Japan | 350/6.8 |

Primary Examiner—Rodney B. Bovernick
Assistant Examiner—Loha Ben
Attorney, Agent, or Firm—Fitzpatrick Cella Harper & Scinto

[57] ABSTRACT

A rotating polygon mirror includes a polygon cylinder having a reflection mirror surface formed on at least one of the sides thereof, and mount portions formed on an upper surface and a lower surface thereof, which are to be held by mount members of a laser scan type optical system. At least one of the mount portions on the upper and lower surfaces has such a shape that, when two rotating polygon mirrors are stacked with their non-corresponding mount portions abutting each other, a reference surface formed in at least one of the mount portions of one rotating polygon mirror does not contact the mount portion of the other rotating polygon mirror.

11 Claims, 3 Drawing Sheets

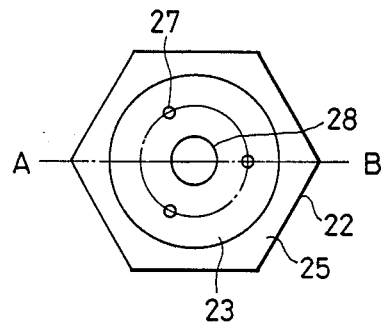
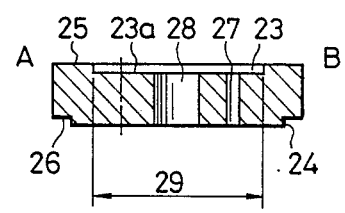
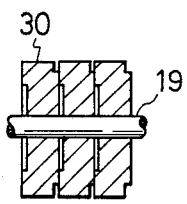
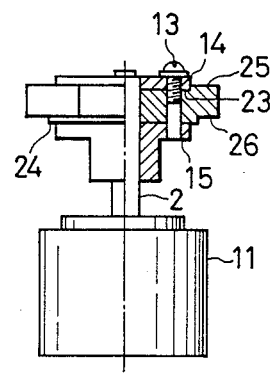

ROTATING POLYGON MIRROR

BACKGROUND OF THE INVENTION

1. Field of the Invention

The present invention relates to a rotating polygon mirror used in a laser scan type optical system, and more particularly to a rotating polygon mirror which prevents contact of mount portions of the rotating polygon mirrors when a plurality of rotating polygon mirrors are stacked with the mounting portions abutting each other, and prevents damages of the mounting portions due to the contact from occurring.

2. Description of the Prior Art

The rotating polygon mirror is mounted on a laser scan type optical system to change a light path of a laser beam so that the laser beam scans a photosensing surface. Typically, it is formed by polishing or precisely grinding sides of polygon bar made of optical glass or metal such as aluminum to form reflection mirror surfaces.

Such a rotating polygon mirror has continuous upper and lower planes 1 and 2 as shown in FIG. 1A or offset upper and lower surfaces 3 and 4 as shown in FIG. 1B.

However, when a number of such rotating polygon mirrors are stacked with their upper and lower surfaces abutting each other during manufacture, storage or transportation, dust may be held between the surfaces of the stacked mirrors and the stacked surfaces are damaged, or the stacked surfaces are rubbed by each other and the stacked surfaces are damaged. As shown in FIG. 2, when the rotating polygon mirror 10 is mounted to a rotating device shaft 12 of a scan motor 11 of a scan device by a screw 13 with the upper surface 1 or the lower surface 2 of the rotating polygon mirror 10 being set as a reference plane, if mount portions of the rotating polygon mirror 10, that is, the portions to be held by mounting members 14 and 15, particularly a reference surface which should be precisely normal to the reflection mirror plane has the damage, a scan plane angle precision is lowered. Accordingly, it is necessary to prevent such damage.

In the rotating polygon mirror of the above construction, when a coating is applied to the mirror surface by vapor-depositing Al, Cu, Au, Ag, $SiO_2$, $MgF_2$, or $Al_2O_3$ in order to protect the mirror surface and/or enhance a reflection function of the surface, a plurality of rotating polygon mirrors 18 are set on a vapor deposition jig shaft as shown in FIG. 3. In order to prevent damage of the rotating polygon mirrors and excess deposition of evaporated materials on the upper and lower surfaces of the rotating polygon mirrors, spacers 20 must be arranged between the respective rotating polygon mirrors. As a result, the number of mirrors set in one vapor deposition process is limited because of a limited space in the evaporation bath. That is, the space in the evaporation bath is partially occupied by the spacers.

SUMMARY OF THE INVENTION

It is an object of the present invention to provide a rotating polygon mirror which prevents contact of mounting portions, particularly reference surfaces of the rotating polygon mirrors when a number of polygon mirrors are stacked with the mounting portions abutting each other, and prevents damages due to the contact from occurring in the mounting portions and allows elimination of spacers in the vapor deposition process.

In order to achieve the above object, the rotating polygon mirror of the present invention comprises a polygon cylinder having a reflection mirror surface on at least one side thereof and mount portions on upper and lower surfaces thereof, which are to be held by mount members of a laser scan type optical system. At least one of the mount portions on the upper and lower surfaces has a shape to prevent a reference surface formed on at least one of the mount portions from being contacted by other portions when two rotating polygon mirrors are placed with noncorresponding mounting portions thereof facing each other.

BRIEF DESCRIPTION OF THE DRAWINGS

FIG. 4 shows an embodiment of a rotating polygon mirror of the present invention, FIG. 4A is a plan view, and FIG. 4B is a sectional view taken along a line A-B of FIG. 4A.

FIG. 5 is a sectional view of the rotating polygon mirrors of the present invention set on an evaporation jig, FIG. 6 shows the rotating polygon mirror of the present invention mounted on a scan device.

DESCRIPTION OF THE PREFERRED EMBODIMENTS

Figure 1A:
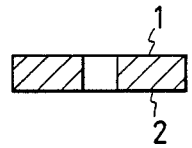
FIGS. 1A and 1B show sectional views of prior art rotating polygon mirrors.
Figure 1B:
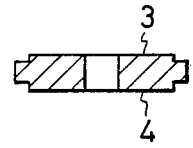
Figure 2:
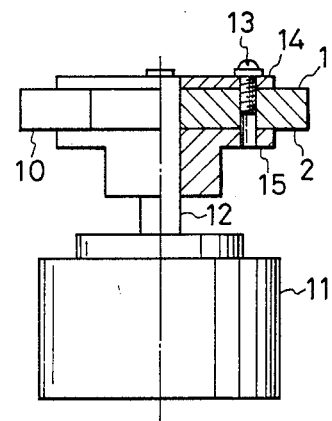
FIG. 2 is a sectional view showing the prior art rotating polygon mirror mounted on a scan device.
Figure 3:
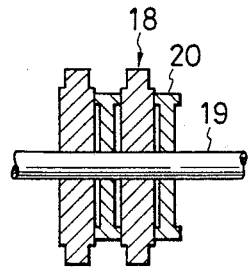
FIG. 3 is a sectional view showing the prior art rotating polygon mirrors set on an evaporation jig.

FIG. 4 shows a first embodiment of the rotating polygon mirror of the present invention, FIG. 4A is a plan view, FIG. 4B is a sectional view taken along a line A-B in FIG. 4A, and FIG. 5 shows the rotating polygon mirrors of the first embodiment mounted on an evaporation jig.

Numeral 22 denotes reflection planes formed on sides of a regular hexagonal cylinder, numeral 23 denotes a recess formed in an upper surface 25, numeral 24 denotes a projection formed in a lower surface 26, numeral 27 denotes holes for screws, numeral 28 denotes a through-hole into which a rotary drive shaft of a scan device is to be inserted, and numeral 29 denotes a range or reference surface which is to be contacted to a mount member of the scan device.

The recess 23 is of circular shape which is coaxial with the hexagonal cylinder, and a bottom surface 23a thereof has a shape and size corresponding to those of the mount member 14 shown in FIG. 6 so that it is precisely formed to fit the mount member 14.

The projection 24 is of a circular shape which is coaxial with the hexagonal cylinder and has a larger diameter than the recess 23.

In the first embodiment, at least the bottom surface 23a of the recess 23 has the shape and the size corresponding to those of the mount member 14 of the scan device, and the projection 24 has such shape, size and depth that, when a plurality of rotating polygon mirrors are stacked with the upper surface and the lower surface abutting each other, the bottom surface 23a of the recess 23 formed in the upper surface of one rotating polygon mirror does not contact the top surface of the projection 24 formed in the lower surface of adjacent rotating polygon mirror.

The recess and the projection of the present embodiment of the rotating polygon mirror may be of any shape and size so long as they meet the above requirement, but from a standpoint of balance during the rotation of the rotating polygon mirror and for ease in machining, a symmetric shape with respect to the center axis of the regular polygon cylinder such as a circle or regular polygon is preferable.

Figure 7:
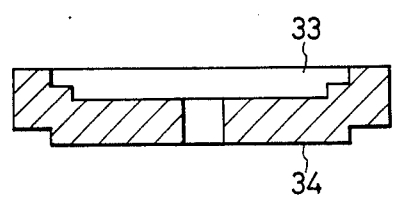
FIGS. 7 and 8 are sectional views of modifications of the first embodiment.
Figure 8:
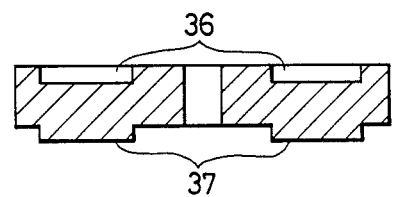

As shown in FIG. 7, the recess 33 may have a plurality of steps so that, when the recess 33 of one rotating polygon mirror abuts the projection 34 of another rotating polygon mirror, the top surface of the projection does not contact the bottom surface of the projection; alternatively as shown in FIG. 8, a plurality of recesses 36 of the same depth and/or a plurality of projections 37 of the same height may be formed. In the latter case, the shape of the mounting member is also changed to fit the plurality of recesses 36 and/or projections 37.

Other embodiments are explained with reference to FIGS. 9 to 12.

Figure 9:
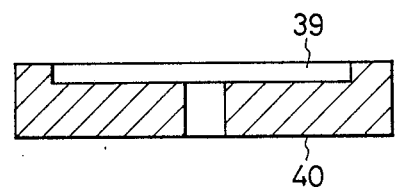
FIGS. 9 to 12 are sectional views of other embodiments of the present invention.

In the embodiment of FIG. 9, the recess 39 is formed only in the upper surface but the lower surface has a flat surface 40. In the present embodiment, when the rotating polygon mirrors are stacked, the bottom surface of the recess 39 and the mount portion of the lower surface do not make contact.

Figure 10:
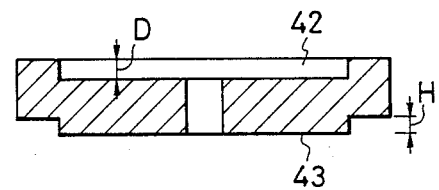

In the embodiment of FIG. 10, a recess 42 formed in the upper surface is larger than a projection 43 formed on the lower surface but a depth D of the recess 42 is larger than a height H of the projection 43. Accordingly, when the rotating polygon mirrors are stacked, the mount portions do not make contact.

Figure 11:
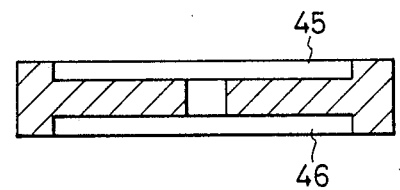

In the embodiment of FIG. 11, recesses 45 and 46 are formed in both the upper and lower surfaces respectively to form the mount portions.

Figure 12:
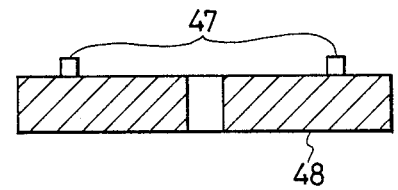

In the embodiment of FIG. 12, a plurality of projections 47 are formed on the upper surface in a ring shape and the lower surface has a flat surface 48.

In the embodiment shown in FIG. 4, the rotating polygon mirror is a regular hexagonal cylinder although it is not restrictive alternative shapes may be used.

In the rotating polygon mirror of the present invention, when a plurality of rotating polygon mirrors are stacked with their upper surfaces and lower surfaces abutting to each other, the portions on those surfaces, which are to be held by the mount members of the scan device, particularly the reference surfaces, do not contact each other so that the occurrence of damage in those portions is prevented and precise mounting to the scan device is permitted.

Since the rotating polygon mirrors can be stacked one on the other and the mount surfaces of the rotating polygon mirrors thus stacked do not make contact to each other, they need not be set on the evaporation jig with spacers being interposed when the reflection mirror surfaces are to be vapor deposited with Al, Cu, Ag, Au, $SiO_2$, $MgF_2$ or $Al_2O_3$ for the purpose of protection and enhancement of reflection property of the surface. Accordingly, a plurality of rotating polygon mirrors 30 can be set side by side on the evaporation jig shaft 19 shown in FIG. 5. Thus, the number of rotating polygon mirrors accommodated in the evaporation bath increases and manufacturing efficiency is improved.

Since the rotating polygon mirrors of the present invention can be stacked without damaging them, they may be processed in the stacked position in a precise grinding or polishing process to form mirror surfaces. Accordingly, the manufacturing efficiency is further improved.

What is claimed is:

1. A rotating polygon mirror including a polygon cylinder having upper and lower surfaces and a side, said mirror comprising:

at least one reflection mirror surface formed on the side of the polygon cylinder;

a first mount portion formed in the upper surface for engaging with a first mount member of a scan device;

a second mount portion formed in the lower surface for engaging with a second mount member of the scan device; and a surface formed in at least one of said first and second mount portions to be used as a mount reference surface when said rotating polygon mirror is mounted on the scan device;

one of said first and second mount portions having a recess and the other of said first and second mount portions having a projection such that, when two identical rotating polygon mirrors are stacked with said first and second mount portions abutting each other, said mount reference surface formed in at least one of said first and second mount portions of one rotating polygon mirror does not contact the other of the first and second mount portions of the other rotating polygon mirror.

2. A rotating polygon mirror according to Claim 1, wherein said projection extends wider than said recess so that said projection does not fit into said recess when the projection and the recess are abutting each other.

3. A rotating polygon mirror according to Claim 2, wherein a plurality of such projections of the same height and a plurality of such recesses of the same depth are formed.

4. A rotating polygon mirror according to Claim 1, wherein a depth of said recess is larger than a height of said projection so that, when the projection and the recess are abutting each other, the projection fits into the recess but the top surface of the projection does not contact the bottom surface of the recess.

5. A rotating polygon mirror according to Claim 1, wherein said recess has a plurality of steps so that, when the projection and the recess abut each other, the projection fits into the recess but the top surface of the projection abuts against one of the steps and does not contact the bottom surface of the recess.

6. A rotating polygon mirror according to Claim 1, wherein the bottom surface of said recess is used as said mount reference surface.

7. A rotating polygon mirror according to Claim 1, wherein said rotating polygon mirror is of regular polygon cylinder shape, and wherein said recess and said projection have shapes symmetric with respect to a center axis of the regular polygon cylinder.

8. A rotating polygon mirror according to Claim 1, wherein the other of said first and second mount portions comprises a plurality of projections of the same height.

9. A rotating polygon mirror according to Claim 1, wherein one of said first and second mount portions has a plurality of said recesses of the same depth.

10. A rotating polygon mirror including a polygon cylinder having upper and lower surfaces and a side, said mirror comprising:
- at least one reflection mirror surface formed on the side of the polygon cylinder;
- a first mount portion formed on the upper surface for engaging with a first mount member of a scan device;
- a second mount portion formed on the lower surface for engaging with a second mount member of the scan device; and
- a surface formed in at least one of said first and second mount portions to be used as a mount reference surface when said rotating polygon mirror is mounted on the scan device;
- one of said first and second mount portions having a recess and the other of said first and second mount portions having a flat surface such that, when two indentical rotating polygon mirrors are stacked with said first and second mount portions abutting each other, said mount reference surface formed in at least one of said first and second mount portions of one rotating polygon mirror does not contact the other of said first and second mount portions of the other rotating polygon mirror, said recess being formed in the center portion of one of said mount portions.

11. A rotating polygon mirror according to Claim 10, wherein said flat surface is said mount reference surface.

* * * * *